United States Patent
Wang

(10) Patent No.: US 9,836,381 B2
(45) Date of Patent: Dec. 5, 2017

(54) TRANSLATING MACHINE CODES TO STORE METADATA AND TO PROPAGATE METADATA FOR RUN TIME CHECKING OF PROGRAMMING ERRORS

(71) Applicant: Stensal Inc., Foster City, CA (US)

(72) Inventor: Ning Wang, Foster City, CA (US)

(73) Assignee: STENSAL INC., Foster City, CA (US)

( * ) Notice: Subject to any disclaimer, the term of this patent is extended or adjusted under 35 U.S.C. 154(b) by 2 days.

(21) Appl. No.: 15/154,876

(22) Filed: May 13, 2016

(65) Prior Publication Data
US 2016/0335173 A1  Nov. 17, 2016

Related U.S. Application Data

(60) Provisional application No. 62/161,144, filed on May 13, 2015.

(51) Int. Cl.
G06F 9/44 (2006.01)
G06F 11/36 (2006.01)

(52) U.S. Cl.
CPC ............ G06F 11/3644 (2013.01); G06F 8/70 (2013.01); G06F 11/3628 (2013.01)

(58) Field of Classification Search
CPC .......................................................... G06F 9/44
USPC .................................................. 717/131–135
See application file for complete search history.

(56) References Cited

U.S. PATENT DOCUMENTS

| | | | |
|---|---|---|---|
| 2004/0107217 A1 | 6/2004 | Hastings | |
| 2006/0149915 A1* | 7/2006 | Maly | G06F 12/023 711/172 |
| 2007/0074187 A1* | 3/2007 | O'Brien | G06F 8/67 717/140 |
| 2011/0314459 A1* | 12/2011 | Husbands | G06F 8/437 717/151 |
| 2012/0304160 A1 | 11/2012 | Soeder | |

OTHER PUBLICATIONS

International Search Report, PCT Application PCT/US2016/032556, Sep. 26, 2016, 3 pages.

* cited by examiner

*Primary Examiner* — Jae Jeon
(74) *Attorney, Agent, or Firm* — Nixon & Vanderhye PC

(57) ABSTRACT

A method translates the native machine codes that do not allocate memory for metadata, do not store, and do not propagate metadata by augmenting them with extra instructions to allocate memory for metadata, to store, and to populate metadata such that metadata are readily available at run time for checking programming errors.

18 Claims, 4 Drawing Sheets

TRANSLATING MACHINE CODES TO STORE METADATA AND TO PROPAGATE METADATA FOR RUN TIME CHECKING OF PROGRAMMING ERRORS

CROSS-REFERENCE TO RELATED APPLICATIONS

This patent application claims the benefit of U.S. patent application 62/161,144, filed May 13, 2015, which is incorporated by reference along with all other references cited in this application.

BACKGROUND OF THE INVENTION

This invention generally relates to computers security, and more specifically to detecting and preventing computer software vulnerabilities and coding defects.

The native machine codes (e.g., x86 assembly codes, ARM assembly codes, PowerPC assembly codes, and MIPS assembly codes) in their text forms or binary forms compiled from the source codes written in the type unsafe programming languages like C, C++, Object-C, do not contain instructions to allocate memory for metadata, to store metadata, and to propagate metadata.

Metadata are data describing data operated by program codes (machine codes, source codes). The typical metadata are, but not limited to, the length of an array, the liveness of an object, or the source location of an object read from a file. These data are needed to decide whether accessing an array is within its boundary, whether an object still holds valid data.

Without such metadata, the machine codes can access an array beyond its boundary and trespass to other objects, or the machine codes can access an object that is already freed. The above two situations are known as buffer overflow (or buffer-overrun) and use-after-free errors. Even worse, these programming errors can be exploited to execute arbitrary malicious codes, and cause security issues to the IT system running these codes.

Therefore, there is a need for techniques to address such buffer overflow (or buffer-overrun), use-after-free errors, and other problems.

BRIEF SUMMARY OF THE INVENTION

A method translates the native machine codes that do not allocate memory for metadata, do not store, and do not propagate metadata by augmenting them with extra instructions to allocate memory for metadata, to store, and to populate metadata such that metadata are readily available at run time for checking programming errors.

In an implementation, a method includes: providing an original code in a machine code form; scanning the original code and identifying first code of a first code type within the original code that does not allocate memory for metadata; scanning the original code and identifying second code of a second code type within the code that not store metadata by augmenting them with extra instructions to allocate memory for metadata; and scanning the original code and identifying third code of a third code type within the code that not propagate metadata by augmenting them with extra instructions to allocate memory for metadata.

The method includes: for an instance of the first code in the original code, translating and replacing the first code with fourth code in a replacement code, where the fourth code stores and populates metadata such that metadata are readily available at runtime for checking programming errors of the original code; for an instance of the second code in the original code, translating and replacing the second code with fifth code in the replacement code, where the fifth code stores and populates metadata such that metadata are readily available at runtime for checking programming errors of the original code; and for an instance of the third code in the original code, translating and replacing the third code with sixth code in the replacement code, where the sixth code stores and populates metadata such that metadata are readily available at runtime for checking programming errors of the original code.

The method includes: obtaining the replacement code including the fourth, fifth, and sixth codes, where the when executed, the replacement code performs the same software functionality as the original code and prevents at least one of buffer overflow, buffer overrun, or use-after-free type errors.

In various implementations, the technique can translate program code in any format (e.g., source code, machine code, or binary code) into translated program code in any format. In an implementation, a method includes: receiving an original code file having code in a machine code form; scanning the original code file and identifying a first code that prepares a frame pointer within the original code file; scanning the original code file and identifying a second code that reads a parameter passed by a caller within the original code file; and scanning the original code file and identifying a third code that reads or writes local variables within the original code file. The method includes: creating a replacement code file having code in the machine code, where the replacement code is different from the original code.

The creating includes: copying code from the original code file that is not the first code, second code, or third code; replacing the first code with a first replacement code that prepares the frame pointer and reserves additional memory locations to store base addresses and object identifiers of the original code, a storage size of local variables of the original code, a storage size of parameters, and a metadata of a return value of the original code; replacing the second code with a second replacement code that reads the parameter passed by a caller and a metadata of the parameter passed by a caller; and replacing the third code with a third replacement code that reads or writes local variables while taking into account the additional memory locations reserved by the first code.

The method can include: scanning the original code file and identifying a fourth code of a first code type that passes a parameter to a callee within the original code file; scanning the original code file and identifying a fifth code of a second code type that calls a callee within the original code file; and scanning the original code file and identifying a third code of a third code type that pops out a stack and restores a frame pointer within the original code file.

The creating a replacement code file having code in the machine code can include: replacing the fourth code with a fourth replacement code that passes the parameter to the callee and the metadata of the parameter to the callee; replacing the fifth code with a fifth replacement code that calls the callee and retrieves a metadata of a return value; and replacing the sixth code with a sixth replacement code that pops out a stack and restores a frame pointer within the original code file while taking into account the additional memory locations reserved by the first code.

In an implementation, a method includes: receiving an original code file having code in a machine code form; scanning the original code file and identifying a first code within the original code file that allocates an array in memory; creating a replacement code file having code in the machine code, where the replacement code is different from the original code.

The creating can include: copying code from the original code file that does not include the first code; replacing the first code with a first replacement code comprising allocating extra memory on a stack for storing a size of a number of local variables and a size of a number of parameters being passed to a callee. The replacement code file prevents at least one of buffer overflow, buffer overrun, or use-after-free type errors associated with the first code.

The allocated stack storage can be partitioned as two objects, where the local variables are aggregated as a first data structure, and the parameters passed to the callee is aggregated as a second data structure that is separate from the first data structure. Alternatively, the allocated stack storage can be partitioned as one object, where the local variables are aggregated and the parameters passed to the callee is aggregated as a single data structure.

The first code can include local variables that store pointers of memory objects, where base addresses and the unique identifiers, representing liveness information, of memory objects are to be preserved on a stack. The first code can include local variables that store pointers of memory objects, where addresses of the local variables are stored in other nonlocal memory objects or are passed to a callee. The first code does not include local variables that store pointers of memory objects, where addresses of the local variables are not stored in other nonlocal memory objects or are not passed to a callee.

Other objects, features, and advantages of the present invention will become apparent upon consideration of the following detailed description and the accompanying drawings, in which like reference designations represent like features throughout the figures.

DETAILED DESCRIPTION OF THE INVENTION

This patent application uses a C source code, and its native x86 code compiled with the x86 cdecl calling convention as the running example to explain the translation methods. Many other code formats (e.g., various other native machine codes including ARM) and syntaxes, and may be used. Specifically, the C source code and its native x86 code is in Intel syntax. It is important to note, a translation method of the invention is not limited to x86 codes and cdecl calling convention, and is applicable to other native machine codes and calling conventions.

TABLE A

| C source code | x86 code in cdecl | |
|---|---|---|
| extern int * bar (int * b, ...); | push | ebp |
| float gfa[3]; | mov | ebp, esp |
| int foo (int * i) | sub | esp, 40 |
| { | mov | eax, dword ptr [ebp + 8] |
| int lia[14], * ptr; | mov | eax, dword ptr [eax] |
| lia[0] = *i; | mov | dword ptr [ebp − 20], eax |
| ptr = bar (lia, gfa); | mov | dword ptr [esp + 4], 0 |
| return *ptr; | lea | eax, dword ptr [ebp − 20] |
| } | mov | dword ptr [esp], eax |
| | call | −4 |
| | mov | dword ptr [ebp − 12], eax |
| | mov | eax, dword ptr [ebp − 12] |
| | mov | eax, dword ptr [eax] |
| | leave | |
| | ret | |

In table A, the left column is a C source code, and the right column is the x86 native code compiled from the C source code in an Intel syntax text form. The x86 native code is compiled by gcc with the default cdecl calling convention. In the C source code, gfa is a global array of float, and lia is a local array of int. The addresses of both arrays are passed to bar, which reads and writes data stored in the two arrays. Without knowing the sizes of the two arrays, bar can access them beyond their boundaries and cause buffer overflow (or buffer overrun) errors and overwrites other data that are needed to perform a correct execution of this code.

Figure 1:
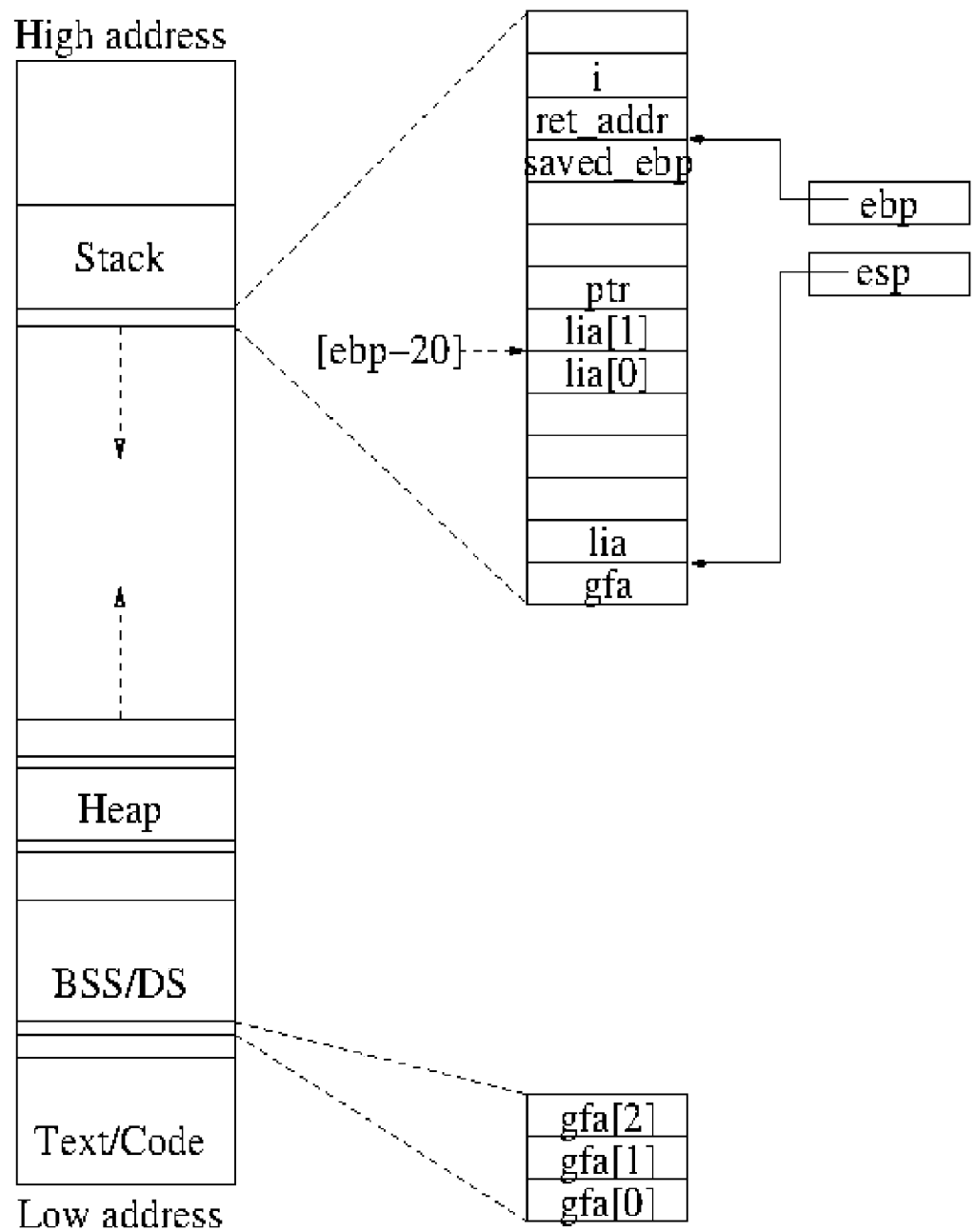
FIG. 1 shows the run time memory layout of the machine code before an instruction "call −4" is executed.

FIG. 1 shows the run time memory layout of the machine code before the instruction "call−4" is executed. The formal parameter i is located at the memory pointed by ebp+8. The local variable lia is located at the memory pointed by ebp−20. The actual parameters gfa and lia are passed to the callee through the memory locations pointed by esp−4 and esp respectively.

A Translation Method

Using x86 machine code shown in FIG. 1 as an example, table B shows in how a translation introduces extra instructions and rewrite the original instructions to achieve the following goals:

1. Allocate extra memory for storing metadata.
 2. Store metadata in the above allocated memory.
 3. Populate metadata among the above allocated memory and pass metadata to a callee.

This translation works for all machine code patterns even if the size of stack allocation for local variables is a run time value instead of a constant. In the later section, this application will extract the patterns and describe how to apply this translation method to any machine codes.

TABLE B

| Original machine codes | Translated machine codes |
|---|---|
| push  ebp | push  ebp |
| mov   ebp, esp | mov   ebp, esp |
| sub   esp, 40 | //Duplicate the instructions before "call −4" here |
| | //and remove the instructions that do not affect the |
| | //value of esp |
| | sub   esp, 40 |
| | //Begin removing the following instructions |

TABLE B-continued

| Original machine codes | Translated machine codes |
|---|---|
| | mov    eax, dword ptr [ebp + 8] |
| | mov    eax, dword ptr [eax] |
| | mov    dword ptr [ebp − 20], eax |
| | mov    dword ptr [esp + 4], 0 |
| | lea    eax, dword ptr [ebp − 20] |
| | mov    dword ptr [esp], eax |
| | //End removing instructions |
| | //The following instructions are only needed if the esp's |
| | //adjustment is not a constant. They are not required |
| | //for this translation. These are listed here for the sake of |
| | //completeness. |
| | mov    eax, ebp |
| | sub    eax, esp |
| | mov    dword ptr[ebp+4], eax |
| | sub    esp, 4 |
| | sub    esp, eax |
| | sub    esp, eax |
| | sub    esp, 4 |
| mov    eax, dword ptr [ebp + 8] | mov    eax, dword ptr[ebp+8+12] |
| | // the following instructions load the metadata |
| | // of the value stored at [ebp+8+12] |
| | mov    ecx, dword ptr[ebp+8+8] //load dsect.size |
| | mov    edx, dword ptr[ebp+8+12+ecx] //load i_base |
| | mov    %s, dword ptr[edx−4] // load i_size |
| mov    eax, dword ptr [eax] | if eax > edx then buffer-underflow error |
| | add    edx, %s |
| | if eax +4 > edx then buffer-overflow error |
| | mov    eax, dword ptr[eax] |
| mov    dword ptr [ebp−20], eax | mov    dword ptr[ebp−20−(40+40+4)], eax |
| mov    dword ptr [esp+4], 0 | mov    dword ptr[esp+4+12], 4 |
| | mov    dword ptr[esp+4+12+40], 0 // the base address of gfa |
| | mov    dword ptr[esp+4+12+40+40],1 // the uid of gfa |
| lea    eax, dword ptr [ebp−20] | lea    eax, dword ptr [ebp−20−(40+40+4) ] |
| | lea    %b, dword ptr [esp−4] |
| mov    dword ptr [esp], eax | mov    dword ptr [esp+12], eax |
| | mov    dword ptr [esp+12+40], %b // store the base address |
| | mov    dword ptr [esp+12+40+40], 2 // store the uid of stack objects |
| | mov    dword ptr [esp], 40 |
| call    −4 | call    −4 |
| | mov    %b, dword ptr [ebp+8] |
| | mov    %id, dword ptr [ebp+12] |
| mov    dword ptr [ebp−12], eax | mov    dword ptr[ebp−12−(40+40+4)], eax |
| | mov    dword ptr[ebp−12−(40−4)], %b |
| | mov    dword ptr[ebp−12−4], %id |
| mov    eax, dword ptr [ebp−12] | mov    eax, dword ptr[ebp−12−(40+40+4)] |
| | mov    %b, dword ptr[ebp−12−(40+4)] |
| | mov    %id, dword ptr[ebp−12−(4)] |
| mov    eax, dword ptr [eax] | mov    eax, dword ptr [eax] |
| leave | mov    dword ptr[esp], %b |
| | mov    dword ptr[esp+4], %id |
| | leave |
| ret | ret |

Figure 2:
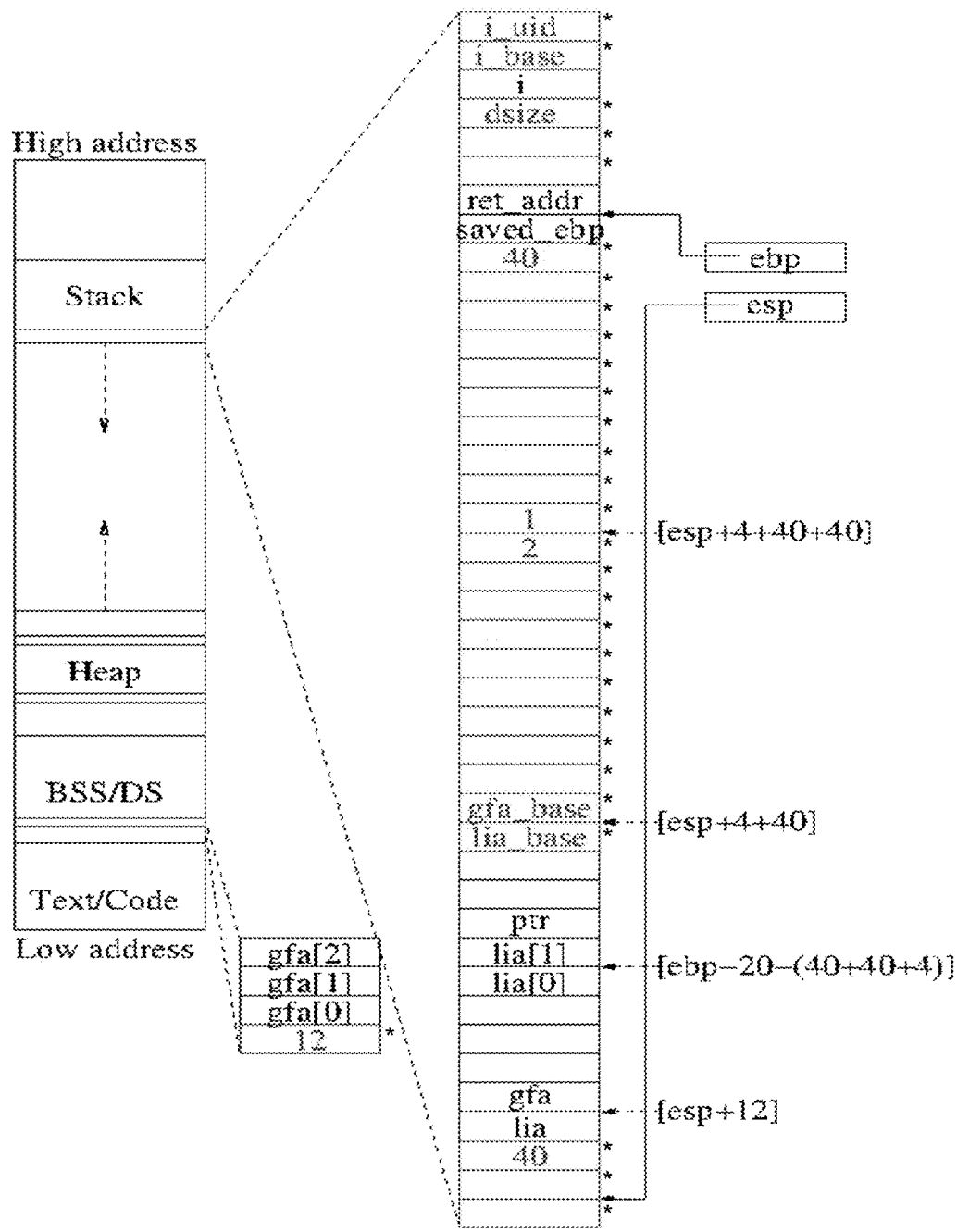
FIG. 2 shows the memory layout of the translated code before the "call −4" is executed.

The memory layout of the translated code before "call −4" is executed is shown in FIG. 2. In FIG. 2, the memory locations (or boxes) and content indicated with an asterisk represent the metadata added by the translated code.

FIG. 2 shows the memory layout of the translated code before "call −4" is executed.

An optimum translation can minimize the increasing of the stack size. In the above sample translation, the stack size is increased by two times. In other implementations, the stack size in increased more than two times greater than the original stack size. However, this increasing in stack size can be optimized and reduced. For example, in other implementations, the stack size in increased up to two times greater than the original stack size.

The following translation is an optimization over the above one when the esp's adjustment is a compile time constant, and the local variables do not store pointers. This is a more common case in the machine codes compiled from C/C++, Object C source codes.

TABLE C

| Original machines codes | Translated machine codes |
|---|---|
| push    ebp | push    ebp |
| mov    ebp, esp | mov    ebp, esp |
| sub    esp, 40 | sub    esp, 40+4+4+16 |
| mov    eax, dword ptr [ebp+8] | mov    eax, dword ptr[ebp+8+12] |
| | // the following instructions load the metadata |

TABLE C-continued

| Original machines codes | Translated machine codes |
| --- | --- |
|  | // of the value stored at [ebp+8+12]<br>mov   ecx, dword ptr[ebp+8+8] //load dsect<br>mov   edx, dword ptr[ebp+8+12+ecx] // load i_base<br>mov   %s, dword ptr[edx-4] //load i_size |
| mov   eax, dword ptr[eax] | if eax > edx then error<br>add   edx, %s<br>if eax +4 > edx then error;<br>mov   eax, dword ptr[eax] |
| mov   dword ptr[ebp-20], eax | mov   dword ptr[ebp-20], eax |
| mov   dword ptr[esp+4], 0 | mov   dword ptr[esp+4+12], 4<br>mov   dword ptr[esp+4+12+8], 4 // the base address of gfa<br>mov   dword ptr[esp+4+12+8+8],1 // the uid of gfa |
| lea   eax, dword ptr[ebp – 20] | lea   eax, dword ptr[ebp-20]// the addr of lia<br>lea   edx, dword ptr[ebp-20]// the base addr of lia |
| mov   dword ptr[esp], eax | mov   dword ptr[esp+12], eax<br>mov   dword ptr[esp+12+8], edx //store the base address<br>mov   dword ptr[esp+12+8+8], 2 //store the uid of stack objects<br>mov   dword ptr[esp+8], 8 |
| call   -4 | call   -4<br>mov   %b, dword ptr[esp]<br>mov   %id, dword ptr[esp+4] |
| mov   dword ptr[ebp-12], eax | mov   dword ptr[ebp-12], eax |
| mov   eax, dword ptr[ebp-12] | mov   eax, dword ptr[ebp-12] |
| mov   eax, dword ptr[eax]<br>leave<br>ret | mov   eax, dword ptr[eax]<br>leave<br>ret |

Figure 3:
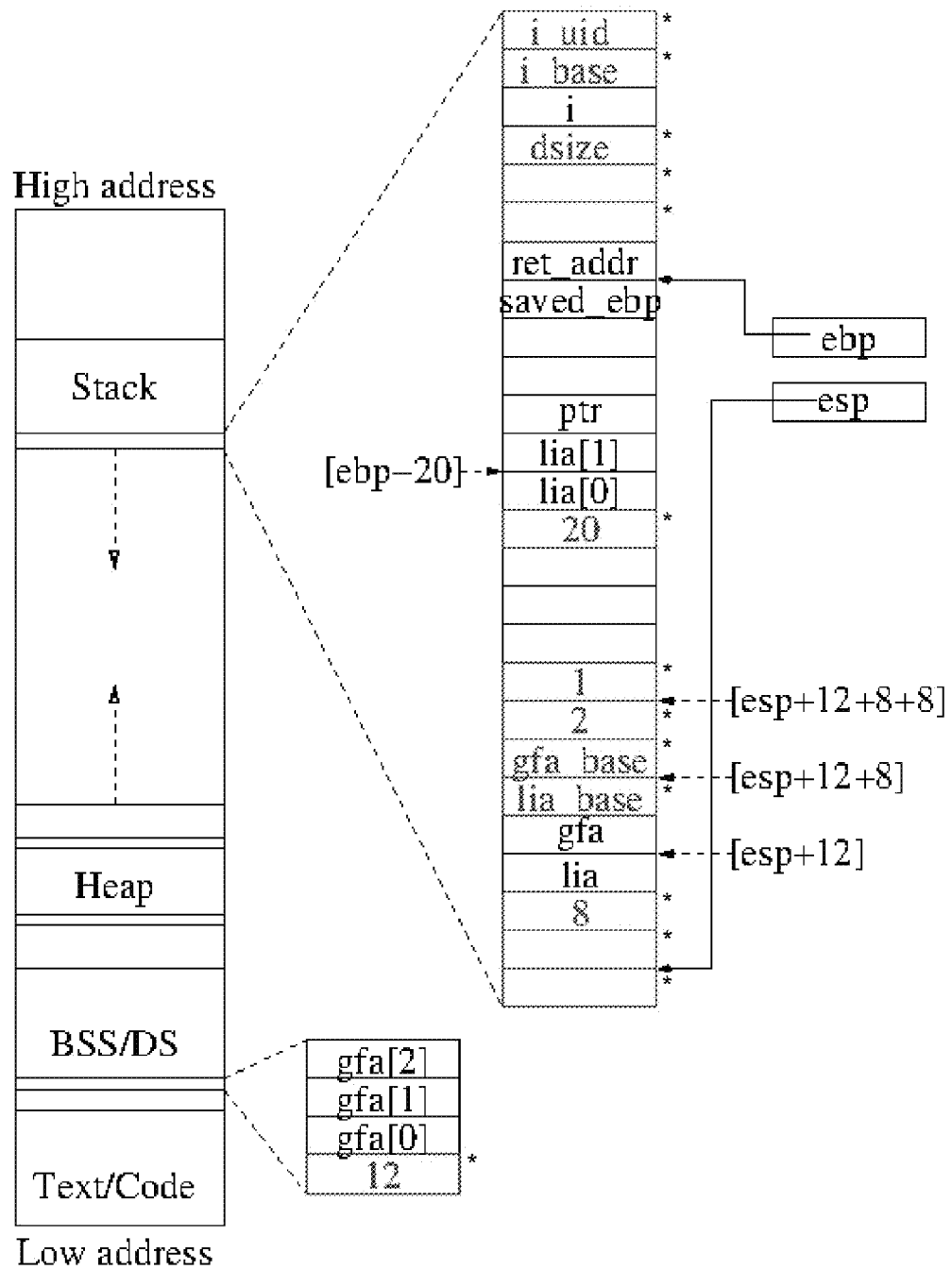
FIG. 3 shows the memory layout of the execution of the machine code in the right column of table C.

The memory layout of the execution of the machine code in the right column is shown in FIG. 3. In FIG. 3, the memory locations (or boxes) and content indicated with an asterisk represent the metadata added by the translated code.

FIG. 3 shows the memory layout of the execution of the machine code in the right column of table C.

Pattern-Based Instruction Translation Methods

This section explains pattern-based instruction translation methods. The translation methods are optimized to reduce the memory needed for storing metadata. In order to minimize the memory needed for storing metadata, the technique identifies the following three cases with respect how local variables of a function are used, and only allocate the needed memory for storing metadata. The three cases are:

1. Local variables store the pointers of memory objects, as such the base addresses and the unique identifiers or ids (representing the liveness information) of memory objects (such as arrays) needed to be preserved on stack.

2. Local variables do not store the pointers of memory objects. Their addresses are stored in other nonlocal memory objects or passed to a callee.

3. Local variables do not store the pointers of memory objects. Their addresses are not stored in other memory objects, and are not passed to a callee.

The technique only needs to translate the machine codes that fall in to the case 1 and case 2. The technique does not need to translate the machine code that belongs to the case 3. Before we enumerate how the translation methods are applied to case 1 and case 2, we enumerate:

1. The instruction patterns of how memory is allocated for local variables.

2. The instruction patterns of how the memory of formal parameters is accessed.

3. The instruction patterns of how the memory allocated for local variables is accessed.

4. The instruction patterns of how actual parameters are passed to a callee.

In the following table D:

TABLE D

| Functions | Instruction patterns |
| --- | --- |
| Allocate memory | sub esp, <value> |
| Allocate memory and store a value | push <data type> <value> |
| Deallocate memory | add esp, <value> |
| Deallocate memory and read a value into a register | pop <register> |
| Read a parameter passed by a caller | mov <dest>, <data type> [ebp+n] |
| Read a local variable | mov <dest>, <data type>[ebp-n] |
| Write a local variable | mov <data type> [ebp-n], <src> |
| Pass a parameter to a callee | mov <data type> [esp+n], <src> |
| Call a callee | call <offset> |
| Pop out stack and restore frame pointer | leave |

In table D, the left and right angle brackets (i.e., "<" and ">") are a place holder and a real value will to substitute for it. A <value> represents any value, <src> is a source value operand, <dest> is a destination operand. A <data type> could be any data type supported by x86 machine instructions such as "dword", "dword ptr," and so forth.

The translation methods should handle the machine code patterns enumerated in the right column in table D. Since case 1 and case 2 require different memory to store metadata. We enumerate the machine instruction pattern based translation rules separately for the two cases. In the following tables, P represents the bytes storing a stack size value, one possible arrangement is P=4 in 32-bit architecture, and P=8 in 64-bit architecture. To simplify this discussion, we assume P is 4, and the data type of a stack size value is dword. The naming convention, such as for example % r as the data, % b as the base address of the data, % id as the liveness identifier or id of the data, is used to illustrate how data and metadata are accessed and passed around. A % s is used to designate the size of memory being accessed through a pointer.

Case 1: The technique allocates extra memory on stack for storing the base addresses, array sizes, and array liveness information.

TABLE E

| Original instruction patterns | Translated instruction patterns |
| --- | --- |
| Prepare frame pointer | Prepare frame pointer |
| push ebp | push ebp |
| mov ebp, esp | mov ebp, esp |
| sub esp, n // n is a constant | /* 2*n bytes are used to store the base addresses and object ids, P bytes are used to store the storage size of all local variables, P bytes are used to store the storage size of all parameters, 2P bytes are used to store the metadate of the return value */ |
| | sub esp, n + (2 * n + P + P + 2P) |
| push <data type> %r | push <data type> %id |
| | push <data type> %b |
| | push <data type> %r |
| | push <data type> <sizeof data type> |
| push <data type> %r | push <data type> %id |
| push <data type> %r1 | push <data type> %id1 |
| push <data type> %r2 | push <data type> %id2 |
| | push <data type> %b |
| | push <data type> %b1 |
| | push <data type> %b2 |
| | push <data type> %r |
| | push <data type> %r1 |
| | push <data type> %r2 |
| | push <data type> <sizeof %r, %r1, and %r2> |
| pop %r | pop %id |
| | pop %b |
| | pop %r |
| Read a parameter passed by a caller | Read a parameter and its metadata passed by a caller |
| mov %r, <data type>[ebp+x] | mov %s, dword ptr[ebp+x+3*P] |
| | mov %r, <data type>[ebp+x+3*P] |
| | mov %b, <data type>[ebp+x+3*P+%s] |
| | mov %id, <data type>[ebp+x+3*P+2*%s] |
| Read/Write the local variables | Read/Write the local variables and their metadata |
| mov %r, <data type>[ebp−x] | mov %r, <data type>[ebp−x−2n] |
| | mov %b, <data type>[ebp−x−n] |
| | mov %id, <data type>[ebp−x] |
| mov <data type>[ebp−x], %r | mov <data type>[ebp−x−2n], %r |
| | mov <data type>[ebp−x−n],%b |
| | mov <data type>[ebp−x], %id |
| Pass a parameter to a callee | Pass a parameter and its metadata to a callee |
| mov <data type>[esp+x],%r | mov <data type>[esp+x+3*P], %r |
| | mov <data type>[esp+x+3*P+n],%b |
| | mov <data type>[esp+x+3*P+2n], %id |
| | Store the size of the current stack |
| | mov dword ptr[esp+2*P], n |
| Call a callee | Call a collee and retrieve the metadata of a return value |
| call, <offset> | call, <offset> |
| | mov %b, dword ptr[esp] |
| | mov %id, dword ptr[esp+4] |
| Pop out stack and restore frame pointer | Pop out stack and restore frame pointer |
| leave | mov dword ptr[ebp+8], %b |
| | mov dword ptr[ebp+8+4], %id |
| | leave |

Not all functions' local variables have constant sizes. If variable length arrays are used as local variables in a function, the storage size for the function's local variables is not a constant. This situation is handled as described in table F.

TABLE F

| Original instruction patterns | Translated instruction patterns |
| --- | --- |
| Prepare frame pointer | Prepare frame pointer |
| push ebp | push ebp |
| mov ebp, esp | mov ebp, esp |

TABLE F-continued

| Original instruction patterns | Translated instruction patterns |
|---|---|
| push ebp<br>mov ebp, esp<br><All stack adjust instructions in between><br>call <target> | <All stack (esp) adjust instructions in between><br>mov eax, ebp<br>sub eax, esp<br>sub esp, [eax+eax+P+P+2P]<br>mov dword ptr[ebp+P], eax<br>mov %stacksize, eax |
| Read a parameters passed by a caller | Read a parameter and its metadata passed by a caller |
| mov %x, <data type>[ebp+x] | mov %s, dword ptr[ebp+8+8]<br>mov %r, <data type>[ebp+x+12]<br>mov %b, <data type>[ebp+x+12+%s]<br>mov %id, <data type>[ebp+x+12+2*%s] |
| Read/Write the local variables | Read/Write the local variables and their metadata |
| mov %r, <data type>[ebp−x] | mov %r, <data type>[ebp−x−2*%stacksize]<br>mov %b, <data type>[ebp−x−%stacksize]<br>mov %id, <data type>[ebp−x] |
| mov <data type>[ebp−x], %r | mov <data type>[ebp−x−2*%stacksize], %r<br>mov <data type>[ebp−x−%stacksize],%b<br>mov <data type>[ebp−x], %id |
| Pass a parameter to a callee | Pass a parameter and its metadata to a callee |
| mov <data type>[esp+x],%r | mov <data type>[esp+x+3*P], %r<br>mov <data type>[esp+x+3*P+%stacksize],%b<br>mov <data type>[esp+x+3*P+2*%stacksize], %id<br>Store the size of the current stack<br>mov dword ptr[esp+2*P], %stacksize |
| Call a callee | Call a callee |
| call, <offset> | call, <offset><br>mov %b, dword ptr[esp]<br>mov %id, dword ptr[esp+4] |
| Pop out stack and restore frame pointer | Pop out stack and restore frame pointer |
| leave | mov dword ptr[ebp+8], %b<br>mov dword ptr[ebp+12], %id<br>leave |

Case 2: The technique allocates extra memory on stack for storing the size of local variables and the size of parameters being passed to a callee because they will be passed to a callee or other memory objects.

TABLE G

| Original instruction patterns | Translated instruction patterns |
|---|---|
| Prepare frame pointer<br>push ebp<br>mov ebp, esp<br>//c and d are constants<br>//c bytes are used for the parameters passing<br>//to a callee, and d bytes are used for the<br>//local variables.<br>sub esp, (c+d) | Prepare frame pointer<br>push ebp<br>mov ebp, esp<br>/* 2*c bytes are used to store the base addresses and object ids, P bytes are used to store the storage size of all local variables, P bytes are used to store the storage size of all parameters, 2P bytes are used to store the metadata of a return value */<br>sub esp, (c+d) + (2 * c + P + P + 2 *P) |
| Read a parameter passed by a caller | Read a parameter and its metadata passed by a caller |
| mov %r, <data type>[ebp+x] | mov %s, dword ptr[ebp+8+2*P]<br>mov %r, <data type>[ebp+x+3*P]<br>mov %b, <data type>[ebp+x+3*P+%s]<br>mov %id, <data type>[ebp+x+3*P+2*%s] |
| Read/Write the local variables | Read/Write the local variables and their metadata |
| mov %r, <data type>[ebp−x]<br>mov <data type>[ebp−x], %r | mov %r, <data type>[ebp−x]<br>mov <data type>[ebp−x], %r<br>Store the size of local variables<br>mov dword ptr[ebp−d−P], d |
| Pass a parameter to a callee | Pass a parameter and its metadata to a callee |
| mov <data type>[esp+x],%r | mov <data type>[esp+x+3*P], %r<br>mov <data type>[esp+x+3*P+c],%b<br>mov <data type>[esp+x+3*P+2c], %id<br>Store the size of the parameters passing to a callee<br>mov dword ptr[esp+2*P], c |

TABLE G-continued

| Original instruction patterns | Translated instruction patterns |
|---|---|
| Call a callee<br>call, <offset> | Call a callee<br>call, <offset><br>mov %b, dword ptr[esp]<br>mov %id, dword ptr[esp+4] |
| Pop out stack and restore framer pointer<br>leave | Pop out stack and restore framer pointer<br>mov dword ptr[ebp+8], %b<br>mov dword ptr[ebp+12], %id<br>leave |

Not all functions' local variables have constant sizes. If variable length arrays are used as local variables in a function, the storage size for the function's local variables is not a constant. This situation is handled as described in table H.

TABLE H

| Original instruction patterns | Translated instruction patterns |
|---|---|
| Prepare framer pointer<br>push ebp<br>mov ebp, esp<br>Push ebp<br>mov ebp, esp<br><All stack (esp) adjust instructions in between><br>call <target> | Prepare frame pointer<br>push ebp<br>mov ebp, esp<br><All stack (esp) adjust instructions in between><br>mov   eax, ebp<br>sub   eax, esp<br>sub   esp, [2* eax+P+P+2*P]<br>mov   dword ptr[ebp+P], eax<br>mov   %stacksize, eax |
| Read a parameters passed by a caller<br>mov %x, <data type>[ebp+x] | Read a parameter and its metadata passed by a caller<br>mov %s, dword ptr[ebp+8+2*P]<br>mov %r, <data type>[ebp+x+3* P]<br>mov %b, <data type>[ebp+x+3*P+%s]<br>mov %id, <data type>[ebp+x+3*P+2*%s] |
| Read/Write the local variables<br>mov %r, <data type>[ebp-x]<br><br>mov <data type>[ebp-x], %r | Read/Write the local variables and their metadata<br>mov %r, <data type>[ebp-x-2*%stacksize]<br>mov %b, <data type>[ebp-x-%stacksize]<br>mov %id, <data type>[ebp-x]<br>mov <data type>[ebp-x-2*%stacksize], %r<br>mov <data type>[ebp-x-%stacksize],%b<br>mov <data type>[ebp-x], %id |
| Pass a parameter to a callee<br>mov <data type>[esp+x],%r | Pass a parameter and its metadata to a callee<br>mov <data type>[esp+x+3*P], %r<br>mov <data type>[esp+x+3*P+%stacksize],%b<br>mov <data type>[esp+x+3*P+2*%stacksize], %id<br>Store the size of the current stack<br>mov dword ptr[esp+2*P], %stacksize |
| Call a callee<br>call, <offset> | Call a callee and propogate the metadata of a returned value<br>call, <offset><br>mov %b, dword ptr[esp]<br>mov %id, dword ptr[eps+P] |
| Pop out stack and restore frame pointer<br>leave | Pop out stack and restore frame pointer<br>mov dword ptr[ebp+8], %b<br>mov dword ptr[ebp+8+P], %id<br>leave |

It is important to note that the technique treats the stack storage allocated to a function as one object or two objects. The difference dictates the complexity of the translation and the memory overhead needed for storing metadata.

If the technique treats the whole allocated stack storage as one object, it means all local variables and parameters passed to a callee are aggregated to form a single data structure. The translation is simple, but the translated code might allocate more memory. Buffer overflows within the data structure may not be detected but will not cause security issues.

If the allocated stack storage is partitioned as two objects: all local variables are aggregated as one data structure, all parameters passed to a callee are aggregated as another data structure. The translation need to handle the accesses to the two objects differently, and hence is more complicate, but the memory allocated for metadata can be reduced.

More fine grained partitions are possible, such as treating each local variable as a data structure. More fine grained partitions are will enable the detection of buffer overflow of local variables. All the partition schemes can detect overflow that may overwrite "ret_addr" or "saved_ebp."

Figure 4:
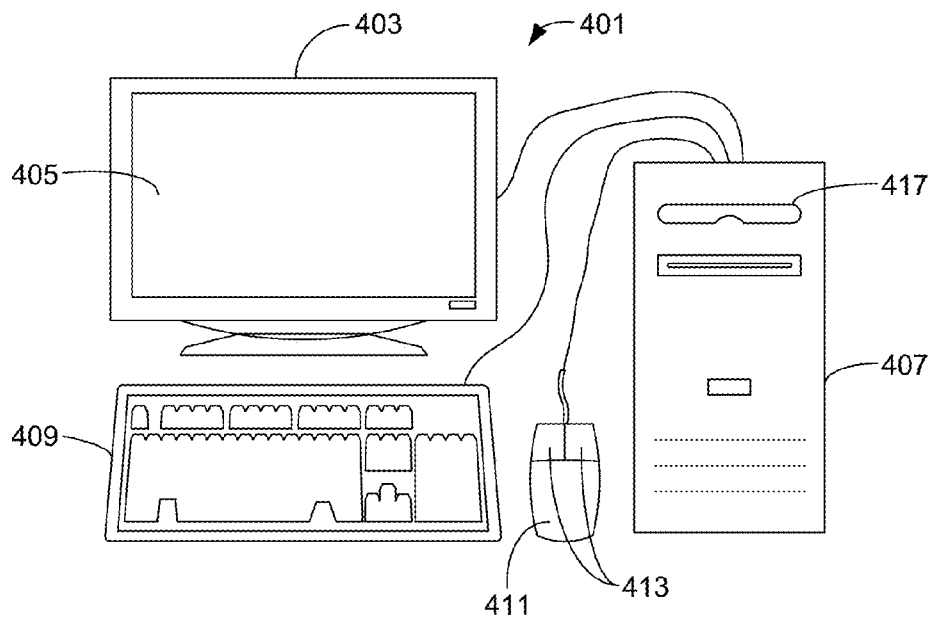
FIG. 4 shows a diagram of a computer (e.g., client or server) that can be used in an implementation of the invention.

FIG. 4 shows a diagram of a computer (e.g., client or server) that can be used in an implementation of the invention. In an embodiment, a computer program product comprising a computer-readable medium bearing computer program code embodied therein for use with a computer, such as shown in FIG. 4. FIG. 4 shows a computer system 401 that includes a monitor 403, screen 405, enclosure 407, keyboard 409, and mouse 411. Mouse 411 may have one or more buttons such as mouse buttons 413. Enclosure 407 (may also be referred to as a system unit, cabinet, or case) houses familiar computer components, some of which are not shown, such as a processor, memory, mass storage devices 417, and the like.

Mass storage devices 417 may include mass disk drives, floppy disks, magnetic disks, optical disks, magneto-optical disks, fixed disks, hard disks, CD-ROMs, recordable CDs, DVDs, recordable DVDs (e.g., DVD-R, DVD+R, DVD-RW, DVD+RW, HD-DVD, or Blu-ray Disc), flash and other nonvolatile solid-state storage (e.g., USB flash drive), battery-backed-up volatile memory, tape storage, reader, and other similar media, and combinations of these.

A computer-implemented or computer-executable version or computer program product of the invention may be embodied using, stored on, or associated with computer-readable medium. A computer-readable medium may include any medium that participates in providing instructions to one or more processors for execution. Such a medium may take many forms including, but not limited to, nonvolatile, volatile, and transmission media. Nonvolatile media includes, for example, flash memory, or optical or magnetic disks. Volatile media includes static or dynamic memory, such as cache memory or RAM. Transmission media includes coaxial cables, copper wire, fiber optic lines, and wires arranged in a bus. Transmission media can also take the form of electromagnetic, radio frequency, acoustic, or light waves, such as those generated during radio wave and infrared data communications.

For example, a binary, machine-executable version, of the software of the present invention may be stored or reside in RAM or cache memory, or on mass storage device 417. The source code of the software of the present invention may also be stored or reside on mass storage device 417 (e.g., hard disk, magnetic disk, tape, or CD-ROM). As a further example, code of the invention may be transmitted via wires, radio waves, or through a network such as the Internet.

Figure 5:
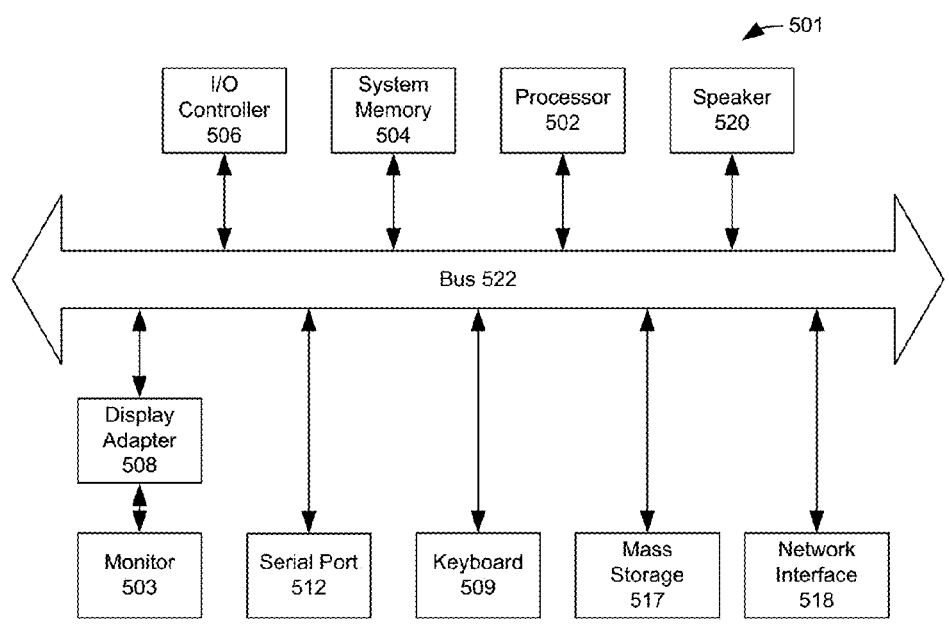
FIG. 5 shows a simplified system block diagram of a computer system used to practice the present invention.

FIG. 5 illustrates a simplified system block diagram of a computer system 501 used to practice the present invention. As in FIG. 4, computer system 401 includes monitor 403, keyboard 409, and mass storage devices 417. Computer system 401 further includes subsystems such as central processor 502, system memory 504, input/output (I/O) controller 506, display adapter 508, serial or universal serial bus (USB) port 512, network interface 518, and speaker 520. The invention may also be used with computer systems with additional or fewer subsystems. For example, a computer system could include more than one processor 502 (i.e., a multiprocessor system) or the system may include a cache memory.

The processor may be a dual core, quad core, or multicore processor, where there are multiple processor cores on a single integrated circuit. The system may also be part of a distributed computing environment. In a distributed computing environment, individual computing systems are connected to a network and are available to lend computing resources to another system in the network as needed. The network may be an internal Ethernet network, Internet, or other network. Some examples of distributed computer systems for solving problems over the Internet include Folding@home, SETI@home, and the Great Internet Mersenne Prime Search (GIMPS).

Arrows such as 522 represent the system bus architecture of computer system 401. However, these arrows are illustrative of any interconnection scheme serving to link the subsystems. For example, speaker 520 could be connected to the other subsystems through a port or have an internal connection to central processor 502. Computer system 401 shown in FIG. 1 is but an example of a computer system suitable for use with the present invention. Other configurations of subsystems suitable for use with the present invention will be readily apparent to one of ordinary skill in the art.

Computer software products may be written in any of various suitable programming languages, such as C, C++, ML, Ocaml, C#, Pascal, Fortran, Perl, Matlab (from MathWorks, Inc.), SAS, SPSS, Java, JavaScript, and others. The computer software product may be an independent application with data input and data display modules. Alternatively, the computer software products may be classes that may be instantiated as distributed objects. The computer software products may also be component software such as Java Beans (from Oracle) or Enterprise Java Beans (EJB from Oracle). All trademarks are the property of their respective owners.

An operating system for the system may be one of the Microsoft Windows® family of operating systems (e.g., Windows 95, 98, Me, Windows NT, Windows 2000, Windows XP, Windows XP x64 Edition, Windows Vista, Windows 7, Windows 10, Windows CE, Windows Mobile), Linux, HP-UX, UNIX, Sun OS, Solaris, Mac OS X, Alpha OS, AIX, IRIX32, or IRIX64, or combinations of these. Microsoft Windows is a trademark of Microsoft Corporation. Other operating systems may be used. All trademarks are the property of their respective owners. A computer in a distributed computing environment may use a different operating system from other computers.

Furthermore, the computer may be connected to a network and may interface to other computers using this network. For example, each computer in the network may perform part of the task of the many series of steps of the invention in parallel. Furthermore, the network may be an intranet, internet, or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, and 802.11n, just to name a few examples). For example, signals from a computer may be transferred, at least in part, wirelessly to components or other computers.

This description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications. This description will enable others skilled in the art to best utilize and practice the invention in various embodiments and with various modifications as are suited to a particular use. The scope of the invention is defined by the following claims.

The invention claimed is:

1. A method comprising:
providing an original code in a machine code form;
scanning the original code and identifying a first code of a first code type within the original code that does not allocate memory for metadata;
scanning the original code and identifying a second code of a second code type within the original code that does not store metadata by augmenting them with extra instructions to allocate memory for metadata;
scanning the original code and identifying a third code of a third code type within the original code that does not propagate metadata by augmenting them with extra instructions to allocate memory for metadata;
for an instance of the first code in the original code, translating and replacing the first code with a fourth code in a replacement code, wherein the fourth code stores and populates metadata such that metadata are readily available at runtime for checking programming errors of the original code;
for an instance of the second code in the original code, translating and replacing the second code with a fifth code in the replacement code, wherein the fifth code stores and populates metadata such that metadata are readily available at runtime for checking programming errors of the original code;
for an instance of the third code in the original code, translating and replacing the third code with a sixth code in the replacement code, wherein the sixth code stores and populates metadata such that metadata are readily available at runtime for checking programming errors of the original code; and
obtaining the replacement code including the fourth, fifth, and sixth codes, wherein, upon executed, the replacement code performs the same software functionality as the original code and prevents at least one of buffer overflow, buffer overrun, or use-after-free type errors,
wherein replacing the first code with the fourth code in the replacement code comprising allocating extra memory on a stack for storing a storage size of a plurality of local variables and a storage size of a plurality of the parameters being passed to a callee.

2. The method of claim 1, wherein the first code comprises
mov eax, dword ptr [ebp+8],
and the fourth code comprises
mov eax, dword ptr[ebp+8+12]
mov ecx, dword ptr[ebp+8+8]
mov edx, dword ptr[ebp+8+12+ecx]
mov % s, dword ptr[edx−4],
wherein the first code is an Intel x86 syntax.

3. The method of claim 1, wherein the first code comprises
sub esp, n,
where n is a constant, and the fourth code comprises
sub esp, n+(2*n+P+2P),
where 2*n bytes are used to store the base addresses and object identifiers, P bytes are used to store the storage size of the local variables, P bytes are used to store the storage size of the parameters, and 2P bytes are used to store metadata of a return value.

4. The method of claim 1, wherein:
the first code prepares a frame pointer within the original code,
wherein the second code reads a parameter passed by a caller within the original code,
wherein the third code that reads or writes local variables within the original code,
wherein the fourth code in the replacement code prepares the frame pointer and reserves additional memory locations to store base addresses and object identifiers of the original code, the storage size of the local variables of the original code, the storage size of the parameters, and/or a metadata of a return value of the original code,
wherein the fifth code in the replacement code reads a parameter passed by a caller and/or metadata of a parameter passed by a caller, and
wherein the sixth code in the replacement code reads or writes local variables while taking into account the additional memory locations reserved by the first code.

5. The method of claim 4, comprising:
scanning the original code and identifying a seventh code of the first code type that passes a parameter to a callee within the original code;
scanning the original code and identifying an eighth code of the second code type that calls a callee within the original code;
scanning the original code and identifying a ninth code of the third code type that pops out a stack and restores a frame pointer within the original code;
replacing the seventh code with a tenth code in the replacement code that passes the parameter to the callee and metadata of the parameter to the callee;
replacing the eighth code with an eleventh code in the replacement code that calls the callee and retrieves metadata of a return value; and
replacing the ninth code with a twelfth code in the replacement code that pops out a stack and restores a frame pointer within the original code while taking into account the additional memory locations reserved by the first code.

6. The method of claim 5, wherein
The seventh code comprises
mov <data type>[esp+x],% r,
where % r comprises data, and
the tenth code in the replacement code comprises
mov <data type>[esp+x+3*P], % r
mov <data type>[esp+x+3*P+n],% b
mov <data type>[esp+x+3*P+2n], % id,
where % b comprises a base address of the data, and % id comprises a liveness identifier of the data.

7. The method of claim 5, wherein
the eighth code comprises
call, <offset>,
and the eleventh code in the replacement code comprises
call, <offset>
mov % b, dword ptr[esp]
mov % id, dword ptr[esp+4],
where % b comprises a base address of data, and % id comprises a liveness identifier of data.

8. The method of claim 5, wherein
The ninth code comprises
leave,
and the twelfth code in the replacement code comprises
mov dword ptr[ebp+8], % b
mov dword ptr[ebp+8+4], % id leave,
where % b comprises a base address of data, and % id comprises a liveness identifier of data.

9. The method of claim 4, wherein
the first code comprises
sub esp, n,
where n is a constant, and the first fourth code in the replacement code comprises
sub esp, n+(2*n+P+P+2P),
where 2*n bytes are used to store the base addresses and object identifiers, P bytes are used to store the storage size of the local variables, P bytes are used to store the storage size of the parameters, and 2P bytes are used to store the metadata of the return value.

10. The method of claim 4, wherein
the first code comprises
push <data type> % r,
where % r comprises data, and
the fourth code in the replacement code comprises
push <data type> % id
push <data type> % b
push <data type> % r
push <data type> <sizeof data type>,
where % id comprises a liveness identifier of the data, and % b comprises a base address of the data.

11. The method of claim 4, wherein
the second code comprises
mov % r, <data type>[ebp+x],
where % r comprises data, and
the fifth code in the replacement code comprises
mov % s, dword ptr[ebp+x+3*P]
mov % r, <data type>[ebp+x+3*P]
mov % b, <data type>[ebp+x+3*P+% s]
mov % id, <data type>[ebp+x+3*P+2*% s],
where % s comprises a size of memory being accessed through a pointer, % b comprises a base address of the data, and % id comprises a liveness identifier of the data.

12. The method of claim 4, wherein
the third code comprises
mov % r, <data type>[ebp-x],
where % r comprises data, and
the sixth code in the replacement code comprises
mov % r, <data type>[ebp-x-2n]
mov % b, <data type>[ebp-x-n]
mov % id, <data type>[ebp-x],
where % b comprises a base address of the data, and % id comprises a liveness identifier of the data.

13. The method of claim 4, wherein
the first code comprises
sub esp, (c+d),
where c and d are constants, c bytes are used for passing the parameters to a callee, and d bytes are used for the local variables, and
the fourth code in the replacement code comprises
sub esp, (c+d)+(2*c+P+P+2*P),
where 2*c bytes are used to store the base addresses and object identifiers, P bytes are used to store the storage size of the local variables, P bytes are used to store the storage size of the parameters, and 2P bytes are used to store the metadata of the return value.

14. The method of claim 1, wherein the allocated stack storage is partitioned as two objects, wherein the local variables are aggregated as a first data structure, and wherein the parameters passed to the callee are aggregated as a second data structure that is separate from the first data structure.

15. The method of claim 1, wherein the allocated stack storage is partitioned as one object, wherein the local variables are aggregated, and wherein the parameters passed to the callee are aggregated as a single data structure.

16. The method of claim 1, wherein the first code comprises local variables that store pointers of memory objects, and wherein a stack preserves base addresses, unique identifiers, and/or liveness information of the memory objects.

17. The method of claim 1, wherein the first code comprises local variables that store pointers of memory objects, and wherein addresses of the local variables are stored in other nonlocal memory objects or are passed to a callee.

18. The method of claim 1, wherein the first code does not comprise local variables that store pointers of memory objects, and wherein addresses of the local variables are not stored in other nonlocal memory objects or are not passed to a callee.

* * * * *